(12) United States Patent
Wilkins et al.

(10) Patent No.: US 8,343,646 B1
(45) Date of Patent: Jan. 1, 2013

(54) SCREEN ARRANGEMENT FOR AN ENERGY STORAGE SYSTEM

(75) Inventors: Howard F. Wilkins, Kalispell, MT (US); Gretchen M. Bothwell, Kalispell, MT (US); Ronald D. Brost, Whitefish, MT (US); Kristine M. Brost, Whitefish, MT (US); Steven L. Peace, Whitefish, MT (US); Paul A. Trudeau, Jr., Kalispell, MT (US); Richard M. Bendert, Kalispell, MT (US); Gerald P. Backer, Southfield, MI (US)

(73) Assignee: Zinc Air Incorporated, Columbia Falls, MT (US)

( * ) Notice: Subject to any disclaimer, the term of this patent is extended or adjusted under 35 U.S.C. 154(b) by 0 days.

(21) Appl. No.: 13/403,026

(22) Filed: Feb. 23, 2012

(51) Int. Cl.
*H01M 4/36* (2006.01)
*H01M 4/42* (2006.01)
*H01M 4/48* (2010.01)
*H01M 6/20* (2006.01)
*H01M 6/24* (2006.01)
*H01M 8/22* (2006.01)

(52) U.S. Cl. ........ 429/105; 429/101; 429/104; 429/402; 429/404; 429/406

(58) Field of Classification Search .................. 429/498, 429/101, 104, 105, 402, 404, 405, 406
See application file for complete search history.

(56) References Cited

U.S. PATENT DOCUMENTS

| | | | |
|---|---|---|---|
| 3,660,259 A | 5/1972 | Danly et al. | |
| 3,859,195 A | 1/1975 | Williams | |
| 3,926,676 A * | 12/1975 | Frie et al. | 429/451 |
| 4,117,206 A * | 9/1978 | Plust et al. | 429/101 |
| 4,180,623 A * | 12/1979 | Adams | 429/400 |
| 4,225,411 A * | 9/1980 | Grune | 204/284 |
| 4,749,462 A | 6/1988 | Bachot et al. | |
| 4,828,666 A * | 5/1989 | Iizuka et al. | 204/255 |
| 5,422,197 A * | 6/1995 | Zito | 429/51 |
| 2005/0201912 A1 | 9/2005 | Minevski et al. | |
| 2006/0057437 A1 | 3/2006 | Finkelshtain et al. | |
| 2007/0298305 A1 * | 12/2007 | Van Burdine | 429/34 |
| 2010/0108537 A1 | 5/2010 | Perego et al. | |
| 2011/0053052 A1 | 3/2011 | Braun et al. | |
| 2011/0244277 A1 | 10/2011 | Gordon, II et al. | |
| 2012/0052347 A1 | 3/2012 | Wilson et al. | |

OTHER PUBLICATIONS

TenCate Nicolon, 3-D Material Breathable Shock Absorption Media, http://www.tencate/com/3674/TenCate-Industrial-Fabrics/Region-North-America/en/Region-North-America-en-Industrial-Fabrics/Industrial-Fabrics/Specialty.

(Continued)

*Primary Examiner* — Basia Ridley
*Assistant Examiner* — Sean P Cullen
(74) *Attorney, Agent, or Firm* — Brooks Kushman P.C.

(57) ABSTRACT

An energy storage system according to the present disclosure includes a cell having an electrode and a deposition facilitating structure proximate the electrode for facilitating deposition of material on the electrode. The deposition facilitating structure includes first and second outer layers and an intermediate support arrangement positioned between the outer layers and connected to the outer layers.

25 Claims, 3 Drawing Sheets

OTHER PUBLICATIONS

Roger P. Hollandsworth et al., Zinc Redox, Battery Development, Phase V—Final Report for the period Nov. 1, 1985-Jan. 31, 1987. Prepared for the U.S. Department of Energy Sandia National Laboratories under Sandia 64-9769, Lockheed Research & Development Division, Lockheed Missiles & Space Company, Inc. Palo Alto, California, Estimated Publication date of May 26, 1987.

Shanna M. Bruer, Ph.D. et al., "Three-Dimensionally Knit Spacer Fabrics: A Review of Production Techniques and Applications" NC State University—JTATM—Journal of Textile and Apparel, Technology and Management, vol. 4, Issue 4, Summer 2005, pp. 1-31.

Roger P. Hollandsworth et al.,—"Zinc/Ferricyanide Battery Development Phase IV", Final Report for the Period May 9, 1983-Feb. 15, 1885, Contractor Report SAND85-7195 Unlimited Release UC-94cb, Printed May 1985.

Roger P. Hollandsworth et al.,—"Zinc Redox Battery Development Phase V", Final Reprot for the period Nov. 1, 1985-Jan. 31, 1987—Prepared for the U.S. Department of Energy Sandia National Laboratories under Sandia 64-9769.

J. Robert Selman et al., "Mass Transfer and Current Distribuiton in a Zinc/Redox-Battery Flow Cell", Nov. 28, 1984.

PCT International Search Report and Written Opinion Dated Mar. 16, 2012, Application No. PCT/US12/29389, Applicant Zinc Air Incorporated, 10 Pages.

* cited by examiner

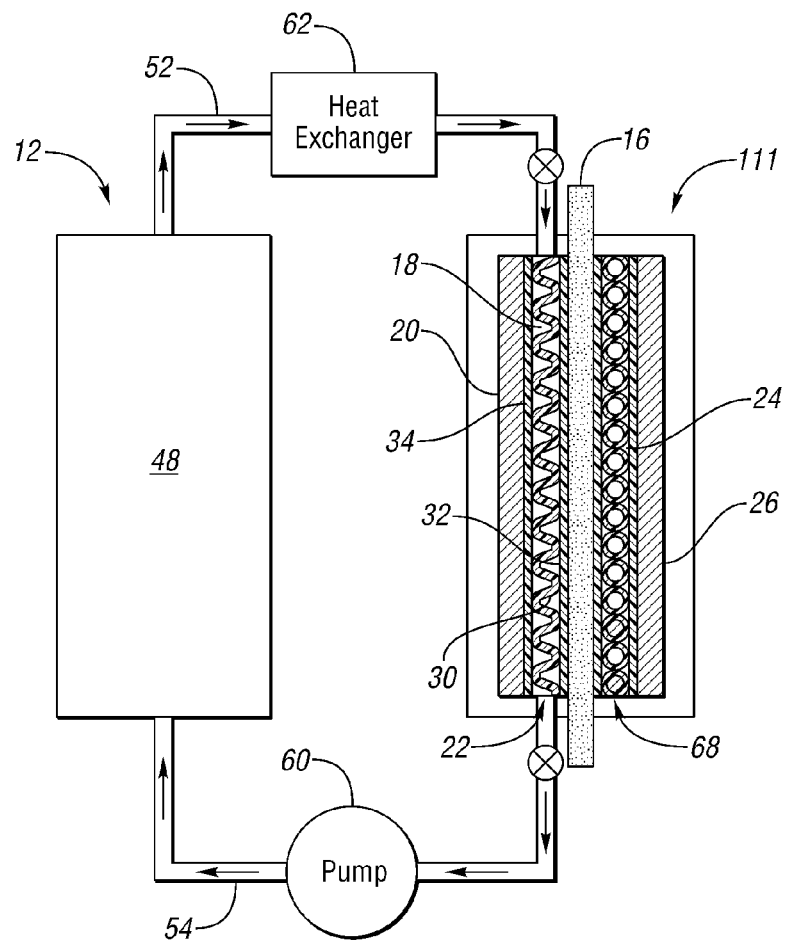
Fig. 6
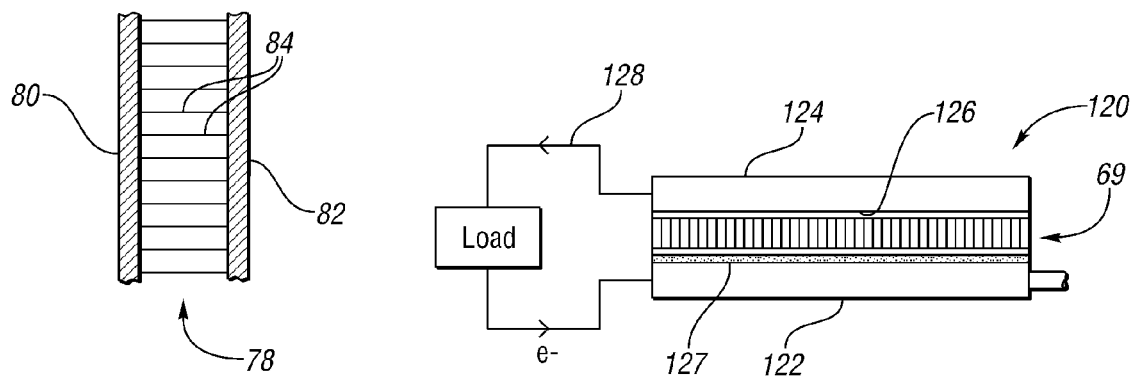
Fig. 5
Fig. 7

SCREEN ARRANGEMENT FOR AN ENERGY STORAGE SYSTEM

TECHNICAL FIELD

The disclosure relates to an energy storage system including one or more cells.

BACKGROUND

An energy storage system, such as a flow battery, may include one or more cells that operate to store energy provided from a source, and to discharge energy to a device to do work. Each cell may have a cathode, an anode and a separator disposed between the cathode and anode for separating chambers of the cell that receive electrolyte. The separator may permit ionic flow between the cathode and anode to facilitate energy storage in the system, as well as discharge of energy from the system. Each cell may further include one or more flow screens that are each positioned between one of the electrodes and the separator, and that are configured to influence flow of electrolyte.

SUMMARY

An energy storage system according to the present disclosure includes a cell having an electrode and a deposition facilitating structure proximate the electrode for facilitating deposition of material on the electrode. The deposition facilitating structure includes first and second outer layers and an intermediate support arrangement positioned between the outer layers and connected to the outer layers.

An energy storage system according to another aspect of the present disclosure includes a cell having an electrode and defining a flow chamber, and a three-dimension structure positioned in the cell proximate the electrode. The three-dimensional structure includes first and second outer layers and an intermediate support structure positioned between the outer layers and connected to the outer layers. The system further includes an electrolyte supply arrangement for supplying electrolyte to the flow chamber, and the three-dimensional structure is configured to enhance mixing of the electrolyte proximate the electrode.

While exemplary embodiments are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 5 is a fragmentary cross-sectional view of yet another embodiment of a three-dimensional structure for use with the cell shown in FIG. 1;

FIG. 6 is a schematic view of another embodiment of an energy storage system according to the present disclosure; and FIG. 7 is a schematic view of yet another embodiment of an energy storage system according to the present disclosure.

DETAILED DESCRIPTION

The present disclosure describes various configurations of energy storage systems. Several specific embodiments are set forth in the following description and in FIGS. 1-7 to provide a thorough understanding of certain embodiments according to the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Furthermore, as those of ordinary skill in the art will understand, one or more features of an embodiment illustrated and described with reference to any one of the Figures may be combined with one or more features illustrated in one or more other Figures to produce embodiments that are not explicitly illustrated or described. In addition, other embodiments may be practiced without one or more of the specific features explained in the following description.

Figure 1:
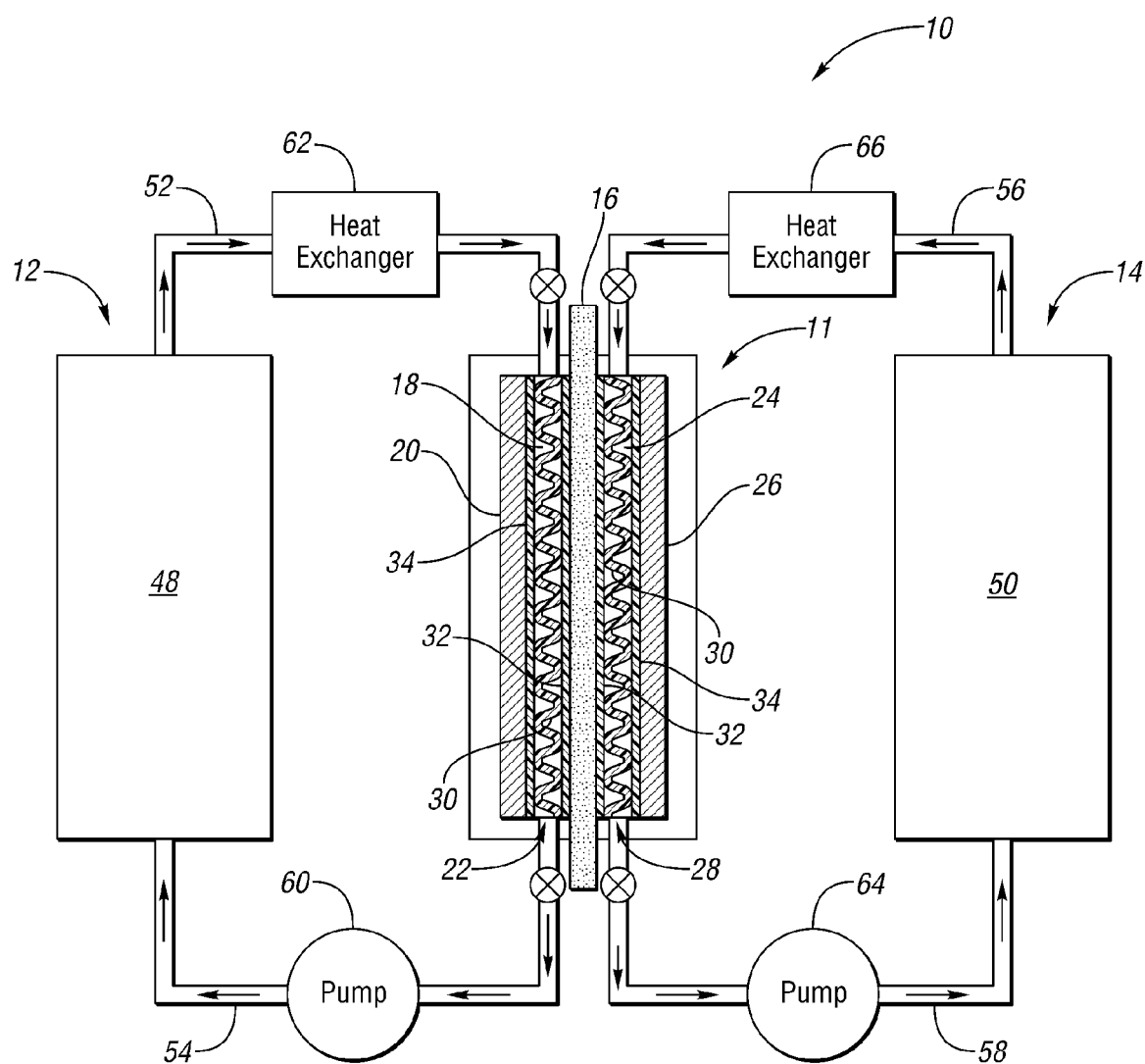
FIG. 1 is a schematic view of an energy storage system according to the present disclosure, including a cell having a cathode, an anode, a separator between the cathode and anode, a first three-dimensional structure proximate the cathode, and a second three-dimensional structure proximate the anode.

FIG. 1 shows an energy storage system 10 according to the present disclosure. In the illustrated embodiment, the system 10 is configured as an electrochemical flow battery that is operable to store energy received from a source, and to discharge energy to one or more devices to do work. For example, the system 10 may be used in electrical utility applications for load leveling, power transmission deferral, wind power integration, and/or solar power integration.

The system 10 shown in FIG. 1 includes a flow cell 11 and first and second electrolyte supply arrangements 12 and 14, respectively, for supplying electrolytes to the cell 11 such that the system 10 forms an electrochemical reactor, as explained below in greater detail. Although the system 10 is shown with a single flow cell 11, the system 10 may include multiple flow cells 11 that are joined together in a cell stack and that each have the same or similar configuration as described below in detail. Examples of cell stacks are disclosed in U.S. patent application Ser. No. 13/196,498, which is hereby incorporated in its entirety by reference.

The cell 11 includes a cathode side and an anode side separated by a separator 16 (e.g., an ion exchange membrane). The cathode side includes a cathode chamber 18 that receives a first electrolyte, such as a catholyte, from the first electrolyte supply arrangement 12; a first electrode, such as cathode 20; and a first three-dimensional structure 22 positioned in the chamber 18 between the cathode 20 and the separator 16. Likewise, the anode side includes an anode chamber 24 that receives a second electrolyte, such as an anolyte, from the second electrolyte supply arrangement 14; a second electrode, such as anode 26; and a second three-dimensional structure 28 positioned in the chamber 24 between the anode 26 and the separator 16.

The cathode 20 and anode 26 may be made of any suitable material and may be electrically connected together to form an electric circuit. For example, the cathode 20 may be formed as a nickel coating, or other suitable coating, on an appropriately conductive or nonconductive substrate, such as a steel or plastic plate, and the anode 26 may be formed as a lead, tin, zinc, or cadmium coating, or other suitable coating, on another appropriately conductive or nonconductive substrate, such as a steel or plastic plate. If the system 10 is provided with multiple cells 11, all of the associated cathodes 20 may communicate electrically and/or ionically, and all of the associated anodes 26 may also communicate electrically and/or ionically. Furthermore, with a multiple cell configuration, the endmost electrodes may function as current collectors. In that regard, with the orientation shown in FIG. 1, the leftmost cathode may function to collect current from the other cathodes, and the rightmost anode may function to collect current from the other anodes. The leftmost cathode and the rightmost anode may also be electrically connected together to form a circuit.

The three-dimensional structures 22 and 28 that are positioned in the chambers 18 and 24, respectively, of the cell 11 may each be positioned proximate the respective electrode 20,26. Furthermore, the structures 22 and 28 may each be engaged with the separator 16 and the respective electrode 20, 26, such that each structure 22, 28 may support the separator 16. In addition, the structures 22 and 28 may facilitate operation of the system 10. For example, each structure 22 and 28 may facilitate deposition of material onto the respective electrode 20, 26 and/or enhance mixing of the electrolyte received in the respective chamber 18, 24, as explained below in more detail.

Figure 2:
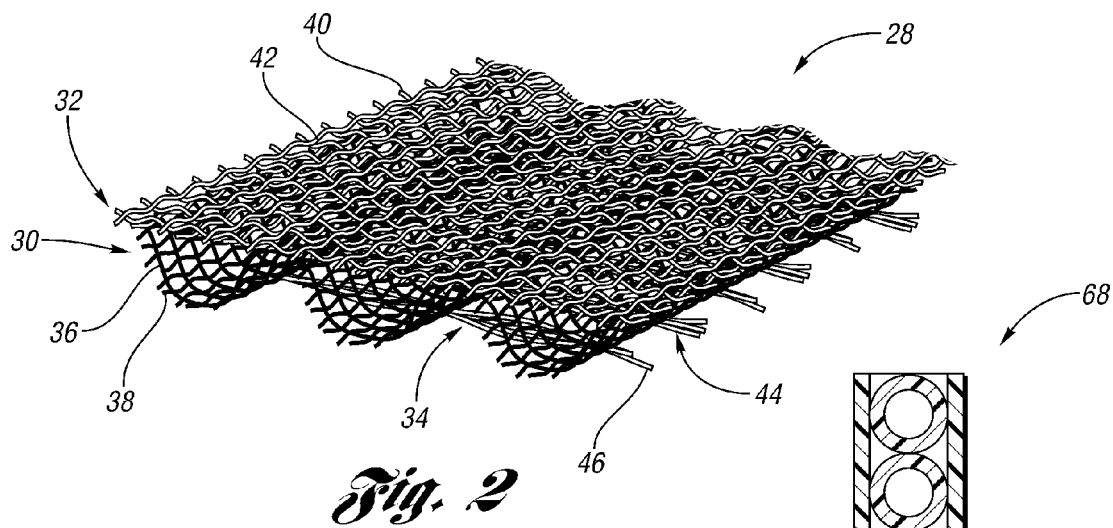
FIG. 2 is a first side perspective view of the second three-dimensional structure shown in FIG. 1.

Referring to FIG. 2, an example configuration of the second three-dimension structure 28 will now be described in detail, with the understanding that the first three-dimensional structure 22 may have the same or similar configuration. In the embodiment shown in FIG. 2, the second structure 28 is configured as a screen arrangement that has a sandwich construction including an intermediate support arrangement or layer 30 positioned between first and second outer layers 32 and 34, respectively. The sandwich construction may have any suitable thickness, such as a thickness in the range of about 1/16 of an inch to 1/2 inch or greater. In one embodiment, the sandwich construction has a thickness of about 1/8 of an inch.

The intermediate layer 30 is configured to support the first and second outer layers 32 and 34, respectively, and space the outer layers 32 and 34 apart. While the intermediate layer 30 may have any suitable configuration and be made of any suitable material, in the embodiment shown in FIGS. 2 and 3, the intermediate layer 30 includes a plurality of longitudinally extending strands or threads 36 woven together with a plurality of laterally extending strands or threads 38 to form a mesh, and the mesh is shaped as a corrugated layer having a plurality of spaced apart peaks and valleys. For example, adjacent peaks and adjacent valleys may be spaced apart by 1/4 to 3/8 of an inch. Furthermore, the peaks and valleys may be oriented generally parallel to the general electrolyte flow direction, or perpendicular to the general electrolyte flow direction to further enhance mixing of the electrolyte.

In another embodiment, the intermediate layer 30 may comprise any suitable support elements that extend between the first and second outer layers 32 and 34, respectively. For example, the intermediate layer 30 may include cylindrical elements, such as strands, wires and/or rods, that extend between and are connected to the first and second outer layers 32 and 34, respectively.

The first outer layer 32 may be engageable with the separator 16 and includes a plurality of longitudinally extending strands or threads 40 woven together with a plurality of laterally extending 42 strands or threads to form a generally planar mesh. The mesh is stitched to the peaks of the intermediate layer 30. As another example, the mesh may be attached to the peaks of the intermediate layer 30 in any suitable manner, such as with an adhesive or by a welding process.

The second outer layer 34 may be engageable with the anode 26, and may also be a generally planar layer. In the embodiment shown in FIGS. 2 and 3, the second outer layer 34 includes a plurality of longitudinally or laterally extending strand or thread groups 44 that are spaced apart from each other. Each group 44 includes multiple strands or threads 46, such as three strands or threads, that are twisted or braided together, and each group 44 is stitched to the valleys of the intermediate layer 30.

As another example, the second outer layer 34 may have the same or similar construction as the first outer layer 32. In that regard, the second outer layer 34 may be formed as a mesh layer having a plurality of longitudinally extending strands or threads woven together with a plurality of laterally extending strands or threads to form a generally planar mesh. As yet another example, one or both of the outer layers 32, 34 may be formed as a cloth layer or any other suitable layer.

The threads used for each layer 30, 32, 34 may be made of any suitable non-conductive and/or conductive material. For example, the threads used for one or more of the layers 30, 32, 34 may be made of a polymeric material, such as polyolefin (e.g., polypropylene and/or polyethylene), polytetrafluoroethylene (e.g., Teflon®), polyester, nylon, and/or any other suitable polymer or plastic material. As another example, the threads used for one or more of the layers 30, 32, 34 may be made of carbon fiber and/or any suitable metal, such as nickel, tin, lead and/or bismuth (e.g., bismuth whiskers). Furthermore, each thread may have any suitable diameter, such as a diameter in the range of 0.005 to 0.015 inches, or a diameter in the range of 0.008 to 0.010 inches. In the embodiment shown in the FIGS. 2 and 3, the threads 36, 38 of the intermediate layer 30 and the threads 40, 42 of the first outer layer 32 each have a diameter of about 0.008 inch, and the threads 46 of the second outer layer 34 each have a diameter of about 0.010 inch.

An example structure that is suitable for use as one or both structures 22, 28 is Nicolon® 3-D material, which is available from TenCate Industrial Fabrics North America of Pendergrass, Ga.

Returning to FIG. 1, the electrolyte supply arrangements 12 and 14 are configured to supply electrolytes to the chambers 18 and 24 of the cell 11, and the electrolytes function to ionically connect the electrodes 20, 26 of the cell 11. The first electrolyte supply arrangement 12 includes a first electrolyte reservoir, such as a catholyte tank 48, in fluid communication with the cathode chamber 18 for storing a catholyte, such as an aqueous solution containing an electrochemically reducible iron salt, cerium salt, halide, or vanadium oxide; water and alkali metal hydroxide or sulfuric acid; or a non-aqueous solution containing ethylammonium nitrate, imidazolium, sodium hexafluorophosphate, lithium hexafluorophosphate, lithium tetrafluoroborate and/or haloaluminate material or materials. Likewise, the second electrolyte supply arrangement 14 includes a second electrolyte reservoir, such as an anolyte tank 50, in fluid communication with the anode chamber 24 and configured to store an anolyte, such as an aqueous solution or slurry containing zinc particles, zinc oxide, iron salt, cerium salt, halide, or vanadium oxide; water and alkali metal hydroxide or sulfuric acid; or a non-aqueous solution containing ethylammonium nitrate, imidazolium, sodium hexafluorophosphate, lithium hexafluorophosphate, lithium tetrafluoroborate and/or haloaluminate material or materials. The catholyte tank 48 may be connected to a housing or body of the cell 11 via a catholyte supply line 52 and a catholyte return line 54, and the anolyte tank 50 may be connected to the housing or body of the cell 11 via an anolyte supply line 56 and an anolyte return line 58. Furthermore, the lines 52, 54, 56 and 58, or portions thereof, may be flexible and/or extendable to accommodate opening and closing of the cell 11.

The first electrolyte supply arrangement 12 may further include a catholyte circulation pump 60 for moving catholyte between the catholyte tank 48 and the cathode chamber 18, a first heat exchanger 62 for controlling temperature of the catholyte, and suitable valves for controlling flow of the catholyte. Likewise, the second electrolyte supply arrangement 14 may include an anolyte circulation pump 64 for moving anolyte between the anolyte tank 50 and the anode chamber 24, a second heat exchanger 66 for controlling temperature of the anolyte, and suitable valves for controlling flow of the anolyte.

Figure 3:
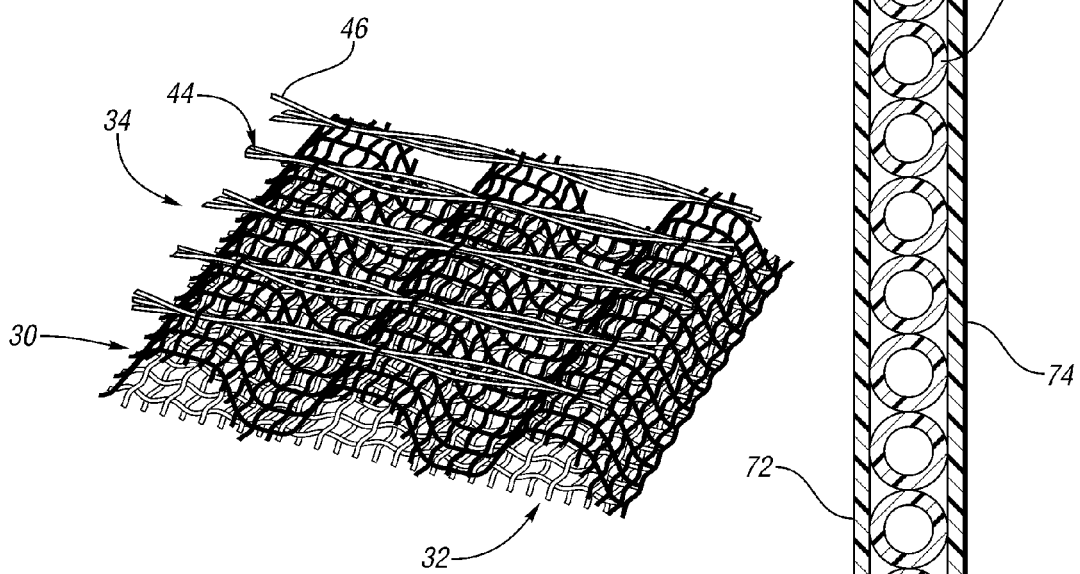
FIG. 3 is an opposite second side perspective view of the three-dimensional structure shown in FIG. 2.

Referring to FIGS. 1-3, operation of the system 10 will now be described in more detail. When the cell 11 is in a closed position shown in FIG. 1, the system 10 may function in a charge mode or a discharge mode. In the charge mode, the system 10 accepts electrical energy from a source and stores the energy through chemical reactions. In the discharge mode, the system 10 may convert chemical energy to electrical energy, which is released to a load in order to do work. In either mode, the separator portion 16 may facilitate chemical reactions, such as oxidation and reduction reactions at the electrodes 20, 26, by allowing ions to pass therethrough from one chamber 18, 24 of the cell 11 to the other chamber 18, 24.

The structures 22 and 28 positioned in the chambers 18 and 24 of the cell 11 may provide numerous benefits during operation of the system 10. First, each structure 22 and 28 may enhance mixing of the respective electrolyte received in the respective chamber 18, 24, such as proximate the respective electrode 20, 26. Second, each structure 22, 28 may provide support to the separator 16, while also being elastic and/or compressible to allow for tolerance variations or movement of the separator 16 during operation. Third, each structure 22, 28 may function as a scaffold or other support structure that supports material that is deposited onto the respective electrode 20, 26 during operation. For example, the mesh construction of the second structure 28 may support zinc material that is deposited onto the anode 26 during a charging operation. Fourth, each structure 22, 28 may function as a filter that traps particles that may break off of the material deposited on the respective electrode 20, 26. For example, the mesh construction of the second structure 28 may trap zinc particles that may break off of the zinc material deposited on the anode 26. Fifth, each structure 22, 28 may cover or mask portions of the respective electrode 20, 26 to thereby increase current density in exposed portions of the respective electrode 20, 26 during operation. For example, the second outer layer 34 of the second structure 28 may cover or masks portions of the anode 26, which results in increased current density in the exposed portions of the anode during a charging operation. The increased current density may enhance deposition or plating of material, such as zinc, during the charging operation.

Figure 4:
FIG. 4 is a cross-sectional view of another embodiment of a three-dimensional structure for use with the cell shown in FIG. 1.

Additional embodiments 68 and 69 of a three-dimensional structure for use with the cell 11 are shown in FIGS. 4 and 5. These structures 68 and 69 may be used on the cathode side and/or anode side of the cell 11, as discussed above with respect to the structures 22 and 28. In that regard, each structure 68, 69 may positioned in a respective chamber 18, 24 and be engaged with the separator 16 and a respective electrode 20, 26. Furthermore, each structure 68, 69 may have any suitable thickness, such as discussed above with respect to the structures 22 and 28.

In the embodiment shown in FIG. 4, the structure 68 includes an intermediate layer 70 sandwiched between first and second outer layers 72 and 74, respectively, and the intermediate layer 70 includes a plurality of flexible, cylindrical mesh elements 76 that are joined together in any suitable manner, such as with stitching, adhesive and/or a welding process. As another example, the cylindrical elements 76 may be spaced apart from each other. Furthermore, the mesh elements 76 may comprise strands or threads that are made of any suitable material, such as the materials discussed above with respect to the structures 22 and 28.

In the embodiment shown in FIG. 4, each cylindrical element 76 extends in a direction generally parallel to the outer layers 72 and 74. In another embodiment, each cylindrical element may extend in a direction generally transverse to the outer layers 72 and 74.

Each outer layer 72, 74 may be generally planar and may comprise one or more layers of flexible cloth or felt, such as woven or knit polyolefin (e.g., polypropylene and/or polyethylene), polyester, and/or carbon fibers. Each outer layer 72, 74 may also be attached to the intermediate layer 70 in any suitable manner, such as with stitching, adhesive, and/or a welding process. As another example, one or both outer layers 72, 74 may have the same or similar construction as discussed above with respect to the outer layers 32 and 34.

In the embodiment shown in FIG. 5, the structure 69 includes an intermediate layer 78 positioned between first and second generally planar outer layers 80 and 82, respectively. The intermediate layer 78 includes a plurality of flexible support elements 84 that extend generally transverse to the outer layers 80 and 82, and each element 84 may have any suitable configuration. For example, each element 84 may be a flexible strand or thread having a straight or curved configuration that extends between the outer layers 80 and 82. Furthermore, the elements 84 may each have any suitable width or diameter, and be spaced apart from each other by any suitable distance. For example, the elements 84 may each have a width or diameter in the range of 0.0005 to 0.004 inches, and the elements 84 may be spaced apart by 0.005 to 0.03 inches. As a more specific example, the elements 84 may each have a width or diameter in the range of 0.001 to 0.002 inches, and be spaced apart by about 0.015 inches. Moreover, the elements 84 may be made of any suitable material, such as any of the materials discussed above with respect to the structures 22 and 28.

Each of the outer layers 80 and 82 may have the same or similar construction as described above with respect to any of the outer layers 32, 34, 72 and 74. Furthermore, the outer layers 80 and 82 may be attached to the intermediate layer 78 in any suitable manner, such as with stitching, adhesive, and/or a welding process.

An example structure that may be suitable for use as the structures 69 is SP60™, which is available from Stanek Netting Co. Ltd. Of Bloomfield, N.J.

Referring to FIG. 6, any of the above described structures 22, 28, 68, 69 may also be used in an energy storage system 110 configured as a "hybrid" type battery, which includes one or more cells 111 that each have a flow side and a non-flow side. In the embodiment shown in FIG. 6, the flow side is designed as a cathode side, and the non-flow side is designed as an anode side.

The cathode side of the cell 111 may have the same configuration as discussed above with respect to the system 10, and may or may not include a first three-dimensional structure, such as the first structure 22, the structure 68, or the structure 69 (first structure 22 is shown in FIG. 5 as an example). Furthermore, the cathode side may be connected to an electrolyte supply arrangement, such as the electrolyte supply arrangement 12 described above in detail.

The anode side of the cell 111 includes fixed or stationary anode electroactive material, rather than flowable electrolyte material as in a flow cell. Furthermore, the anode side may or may not be provided with a second three-dimensional structure, such as the second structure 28, the structure 68, or the structure 69 (structure 68 is shown in FIG. 5 as an example). With such a configuration, the second structure 28, 68, 69 does not affect flow of electrolytes, since the anode side is the non-flow side of the cell 111, but the second structure 28, 68, 69 may provide one or more of the other benefits described above with respect to the system 10.

In another embodiment, the above described structures 22, 28, 68, 69 may be used in a hybrid type battery having one or more cells in which the non-flow side is configured as a cathode side, and the flow side is configured as an anode side.

As yet another example, any of the above described structures 22, 28, 68, 69 may be used in an energy storage system provided with one or more fuel cells that may each have any suitable construction, such as that of fuel cell 120 shown schematically in FIG. 7. In the illustrated embodiment, fuel cell 120 includes a cathode 122, an anode 124, and a chamber, such as an anode chamber 126, between the cathode 122 and anode 124 that may receive one or more of the above structures 22, 28, 68, 69 (structure 69 is shown in FIG. 7 as an example). The cathode 122 and the anode chamber 126 may be separated by a suitable ion-permeable separator 127, such as a membrane or porous structure. The fuel cell is also provided with a supply of fuel, which may take the form of a suitable oxidizable active material, such as porous zinc, that is deposited on the anode 124, along with a suitable electrolyte, such as potassium hydroxide, provided in the anode chamber 126. In addition, the fuel cell 120 is provided a supply of an oxidizing agent, such as oxygen from ambient air or from a storage tank (not shown) connected to the fuel cell 120 through suitable piping. At the anode 124, hydroxide is combined with the active material to create oxidized material, such as zinc ion ($Zn^{+2}$), plus water and negatively charged electrons. The freed electrons may pass through a wire 128 creating an electric current, while the ions may pass through the separator 127 to the cathode 122. Upon reaching the cathode 122, the ions are reunited with electrons and react with the oxidizing agent in the presence of water and a suitable cathode catalyst, such as platinum, to create hydroxide.

In the above embodiment, the electrolyte is contained within the fuel cell 120. In another embodiment, the anode chamber 126 of the fuel cell 120 may be provided with a flowable supply of electrolyte and a flowable active material, such as a zinc slurry. For example, such material may be supplied from a tank (not shown) that is connected to the anode chamber 126 with suitable piping.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An energy storage system comprising:
a cell defining a flow chamber and having first and second electrodes, an ion-permeable separator disposed between the electrodes for allowing ions to pass from one side of the separator to another side of the separator and a deposition facilitating structure disposed between the separator and one of the electrodes for facilitating deposition of material on the one electrode, the deposition facilitating structure comprising first and second outer layers and an intermediate support arrangement positioned between the outer layers and connected to the outer layers; and
an electrolyte supply arrangement for supplying electrolyte to the flow chamber.

2. The energy storage system of claim 1 wherein the deposition facilitating structure is disposed at least partially in the flow chamber.

3. The energy storage system of claim 1 wherein the cell comprises a flow side including the flow chamber, and a non-flow side, and wherein the separator is disposed between the flow side and the non-flow side, and the deposition facilitating structure is disposed in the non-flow side of the cell.

4. The energy storage system of claim 1 wherein the cell is a fuel cell.

5. The energy storage system of claim 1 wherein the intermediate support arrangement comprises a corrugated structure.

6. The energy storage system of claim 5 wherein the corrugated structure comprises a mesh.

7. The energy storage system of claim 1 wherein the intermediate support arrangement comprises one or more cylindrical elements.

8. The energy storage system of claim 1 wherein the intermediate support arrangement comprises multiple strands.

9. The energy storage system of claim 1 wherein at least one of the outer layers comprises cloth.

10. The energy storage system of claim 1 wherein the first outer layer comprises a generally planar mesh that engages the separator to support the separator.

11. The energy storage system of claim 1 wherein the second outer layer engages the one electrode and masks portions of the one electrode to thereby affect current density in exposed portions of the one electrode during a charging operation or a discharging operation of the energy storage system.

12. The energy storage system of claim 1 wherein at least one of the first outer layer, the second outer layer and the intermediate support arrangement of the deposition facilitating structure comprises polymer threads.

13. The energy storage system of claim 1 wherein at least one of the first outer layer, the second outer layer and the intermediate support arrangement of the deposition facilitating structure comprises carbon threads.

14. The energy storage system of claim 1 wherein at least one of the first outer layer, the second outer layer and the intermediate support arrangement of the deposition facilitating structure comprises metallic threads.

15. The energy storage system of claim 1 wherein at least one of the first outer layer, the second outer layer and the intermediate support arrangement of the deposition facilitating structure comprises multiple threads that each have a diameter in the range of 0.005 to 0.015 inches.

16. The energy storage system of claim 1 wherein the deposition facilitating structure is elastic.

17. The energy storage system of claim 1 wherein the electrolyte supply arrangement includes an electrolyte reservoir that stores an electrolyte including zinc oxide, and the deposition facilitating structure is configured to facilitate deposition of zinc on the one electrode during a charging operation of the energy storage system.

18. The energy storage system of claim 17 wherein the deposition facilitating structure is configured to function as a filter that traps zinc particles.

19. An energy storage system comprising:
- a cell defining a flow chamber and having first and second electrodes, and an ion-permeable separator disposed between the electrodes for allowing ions to pass from one side of the separator to another side of the separator;
- a three-dimensional structure positioned in the flow chamber between the first electrode and the separator, the three-dimensional structure including first and second outer layers and an intermediate support structure positioned between the outer layers and connected to the outer layers; and
- an electrolyte supply arrangement for supplying electrolyte to the flow chamber;
- wherein the three-dimensional structure is configured to enhance mixing of the electrolyte proximate the electrode.

20. The energy storage system of claim 19 wherein the intermediate support structure of the three-dimensional structure comprises a corrugated mesh structure.

21. The energy storage system of claim 19 wherein the intermediate support structure comprises one or more mesh cylindrical elements.

22. The energy storage system of claim 19 wherein at least one of the outer layers of the three-dimensional structure comprises a generally planar mesh.

23. The energy storage system of claim 19 wherein the three dimensional structure is configured to filter the electrolyte.

24. The energy storage system of claim 19 wherein the electrolyte supply arrangement includes an electrolyte reservoir that stores an electrolyte including zinc oxide, and the three-dimensional structure is configured to facilitate deposition of zinc on the first electrode during a charging operation of the energy storage system.

25. The energy storage system of claim 24 wherein the first outer layer comprises a generally planar mesh that engages the separator to support the separator, and the second outer layer engages the first electrode and masks portions of the first electrode to thereby affect current density in exposed portions of the first electrode during the charging operation.

* * * * *